United States Patent

Ingus

[11] Patent Number: 5,342,678
[45] Date of Patent: Aug. 30, 1994

[54] METHOD OF TYRE CORD SHEET CONSTRUCTION

[76] Inventor: George A. Ingus, 99 West Heath Road, London NW3 7TN, England

[21] Appl. No.: 916,828

[22] PCT Filed: Feb. 13, 1991

[86] PCT No.: PCT/GB91/00218
§ 371 Date: Oct. 26, 1992
§ 102(e) Date: Oct. 26, 1992

[87] PCT Pub. No.: WO91/12361
PCT Pub. Date: Aug. 22, 1991

[51] Int. Cl.⁵ .................................. B05D 1/18
[52] U.S. Cl. .................. 428/229; 428/225; 428/257; 428/258; 428/259; 427/175; 427/178; 152/526; 152/548; 152/563; 156/148; 156/134; 156/157; 156/304.1; 57/902; 139/426 R
[58] Field of Search .............. 152/526, 536, 548, 556, 152/563; 156/148, 134, 157, 158; 428/57, 192, 225, 257, 258, 229; 427/175, 178, 434.6; 139/426 R; 57/902

[56] References Cited

U.S. PATENT DOCUMENTS

| | | | |
|---|---|---|---|
| 3,677,318 | 7/1972 | Glass et al. | 152/356 |
| 3,863,683 | 2/1975 | Guyot | 139/426 R |
| 3,897,289 | 7/1975 | Di Paola | 156/88 |
| 3,938,313 | 2/1976 | Marzocchi | 57/149 |
| 4,024,895 | 5/1977 | Barron | 139/426 |
| 4,506,717 | 3/1985 | Thise-Fourgon | 152/358 |

FOREIGN PATENT DOCUMENTS 1481684 7/1973 United Kingdom .
2090882A 12/1981 United Kingdom .

Primary Examiner—Shrive Beck
Assistant Examiner—Brian K. Talbot
Attorney, Agent, or Firm—Dressler, Goldsmith, Shore & Milnamow, Ltd.

[57] ABSTRACT

A method of woven webs comprising tire cord splicing headers or tabbies can be stabilized against lateral (weft) distortion without the need for temples, by incorporating reinforcing weft strands of a stiff resilient yarn, i.e. a composite yarn comprising a stiff resilient core mantled with fibers, i.e. staple fibers applied by a core spinning technique.

10 Claims, 2 Drawing Sheets

METHOD OF TYRE CORD SHEET CONSTRUCTION

This invention relates to methods of stiffening and improving resistance to lateral distortion, applicable to flexible webs used astire cord tabbies.

BACKGROUND OF THE INVENTION

It is a particular problem in the handling of webs such as textiles that certain treatments can cause lateral distortion, especially shrinkage. In order to counter this, web-handling machinery is conventionally provided with 'temples' which maintain the lateral extent of the web against shrinkage, warping, etc. by preventing the edges of the web from moving inwards during the weaving process, finishing process and general handling.

Such restraint can frequently lead, however, to splitting of the web, especially when the weft threads (in a woven web) are relatively weak. A particular area where this problem has been encountered is in the production of a tire cord sheet (ply stock) for use in the reinforcement of tires. A typical cord sheet or ply stock comprises a long (typically up to 3000 m) strip of fabric made up of a warp of closely spaced cords, e.g. twisted synthetic filament yarns or wire, with relatively weak and widely spaced cotton weft strands serving to maintain the warp cords in a parallel even array. Each end of a cord sheet of this type comprises a 'tabby'—a short length which is reinforced with densly woven weft strands, conventionally of cotton yarn. The term 'tabby' is used herein to denote the end portion of a length of tire cord sheet, otherwise known as a splicing header, splicing head-end or bordure which is used to handle the cord sheet and, in particular to join sheets together into a long web for further processing. The further processing involves applying longitudinal tension and dipping in an aqueous latex bath and rapid hot-air drying and heat setting in an ascending column drier, thus subjecting the cotton to shrinkage caused by heat and wet. During the dipping process the cord sheet passes over banana rollers and the like which both extend and narrow the width of the sheet, causing non-resilient weft threads to break, leading to splitting or distortion of the sheet. The latexed sheet is then subsequently coated with rubber between calender rolls and split to provide the reinforcement ply material used in tire manufacture.

The main effect of the tabby shrinkage is that the cord sheet becomes distorted over a considerable length near the tabby, with cords moving out of their generally two-dimensional array and becoming superimposed and tangled. The net result of this is that individual ends (warp strands) have different tensions; the spacing between them is irregular and the end product (i.e. the casing material) contains weaker or stronger points, which can seriously effect the safety of the tyre. This means that frequently a portion of the sheet has to be discarded after passing through the subsequent coating step.

Various ways of stabilising the tabby have been tried, including the replacement of cotton by other materials but most conventional yarn materials are subject to distortion or shrinkage during the dipping, drying and heat setting.

Thus, cotton shrinks and is weakened under aqueous conditions. Synthetics such as polyester and polyamide shrink and set under the action of heat. Alternatives such as glass or wire are too smooth for weaving in a tabby weave and would not bind well enough to the warp strands. There is thus a need for a material which can be incorporated in tabbies and which has the resistance to shrinkage under wet and/or hot conditions; does not become permanently heat set; which binds and hence can be successfully woven; and, importantly, in tire cord construction, which can adapt to the changing width of the cord sheet so that the tabby remains the same width as the sheet. The last point is a problem because changes in the width of the sheet can occur by reductions in the widths of the gaps between successive warp strands, but similar changes cannot occur to the same extent in the densely woven tabby.

SUMMARY OF THE INVENTION

I have now discovered that a web such as a tabby can be substantially stabilised by incorporating therein weft strands of a highly resilient, stiff yarn, especially a composite yarn, such as a composite yarn having a stiff core, for example a filament or wire which has been mantled with fibres, e.g. by a core spinning, e.g. a friction spinning, technique. While fine steel wire is a suitable core material for such a composite yarn, a particularly preferred embodiment of this invention comprises a core of glass filaments, either untwisted or with a small degree of twist, mantled with fibres of, for example, polyamide, polyester or cellulose ester, or with natural fibers or with mixtures thereof. The mantle fibres preferably comprise about 10% to 70% of the composite by weight. For tabby production the mantle fibres are preferably mixtures of synthetic and natural fibres which are relatively fine compared with the core filaments.

The glass filament core is preferably of around 800 to 4800 dtex, e.g. about 1360 to 4080. The size of the core will depend on the nature of the tire cord sheet and its intended use. Within certain limits, the tabbies of sheets for lighter tyres need stiffer weft strands than those of sheets for heavier tyres. A light tire cord sheet tends to have wider gaps between the warps than a heavy tyre cord sheet, where the warps lie adjacent one another. Thus, in the lighter tire cord sheet, the weft reinforcement has to maintain the spacing of the warp cords and thus needs to be stiffer; while in the very heavy type cord sheet there is, very little gap to maintain and little space for the wefts, so the core can be as low as 800–1600 dtex. The overall bulk of the composite yarn is not dependent on the stiffness or strength of the core, since the amount of mantling fibre can be adjusted to provide different composite yarns all of the same size but with differing cores. The other function of the mantle fibre is to cushion the yarn and provide weave stability by allowing the warps to grip at the intersections without slipping.

While the yarn comprising mantled glass filament is a preferred embodiment, other stiff yarns are possible provided that they are capable of forming a stable weave, for example monofil yarn which has been surface-roughened, e.g. by a roller treatment; mantled yarn in which the mantle fibres themselves are relatively stiff and the core less so; and co-spun or twist yarns in which a stiff fibre or filament is combined with non-stiff fibres or filaments.

BRIEF DESCRIPTION OF THE DRAWINGS

Specific embodiments of two aspects of the present invention will now be described in more detail with reference to the accompanying drawings in which.

DESCRIPTION OF THE PREFERRED EMBODIMENT

Figure 1:
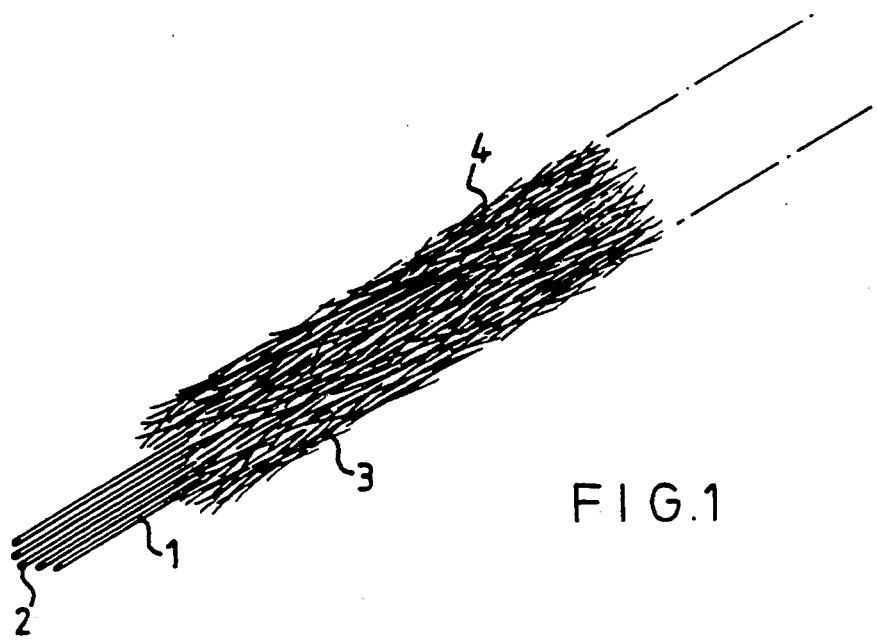
FIG. 1 represents a schematic view of a composite yarn used according to the invention.

The composite yarn shown in FIG. 1 comprises a core 1 of glass filaments 2. Each filament has a typical diameter of 10 microns. There are about 150 filaments in all, giving a total gauge of about 3,000 dtex. The core 1 filaments have no twist. The core 1 is surrounded by a mantle 3 of short random fibres 4 of a mixture of 45% cotton, 45% polyester and 10% acrylic. The mantle 3, which comprises about 32.5% by weight of the total composite yarn is applied to the core 1 by a friction spinning technique. The overall diameter of the composite yarn is about 1.5 mm. The breaking strength for the above described composite yarn is about 15-20 Kg at an elongation of about 2.5%. The strength and especially the stiffness can be selected by the appropriate combination of core and mantle sizes.

A composite yarn of this type is extremely suitable for use as the weft in a tabby as described above and described in more detail below.

Figure 2:
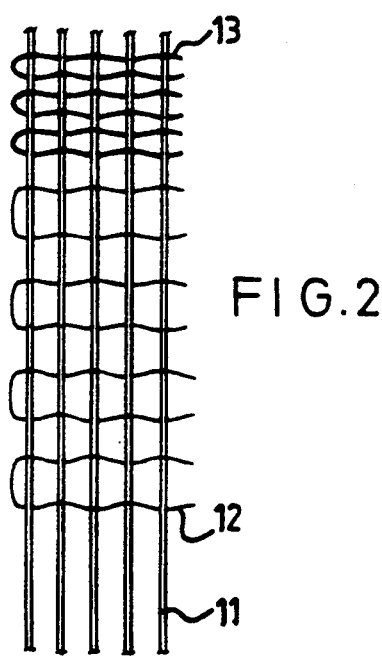
FIG. 2 represents a diagrammatic plan view of part a tire cord sheet with tabby.

FIG. 2 shows a detail of one corner of a tire cord sheet comprising closely spaced warped strands 11, each comprising a drawn, twisted synthetic resin tire cord, such as a polyamide filament yarn of single, two-, three- or multi-ply, depending on the nature of the tire for which it is intended. The warp strands 11 are interwoven with fine weft strands 12, typically spaced about 1 cm apart. These weft strands are typically formed from 16, 20 or 30 singles cotton yarn. Towards the end of the woven piece, the weft strands 12 are replaced by about 16 to 20 rows of reinforcing strands 13 formed from a composite yarn as described with reference to FIG. 1. The reinforcing strands are more closely spaced than the weft strands 12 (typically about 28-64 wefts per decimeter) and, together with the warp strands 11, form a solid tough textile band which serves as the tabby.

Figure 3A:
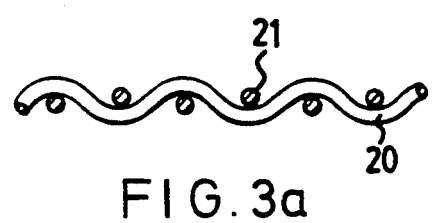
FIG. 3 represents sections through two tabby constructions.
Figure 3B:
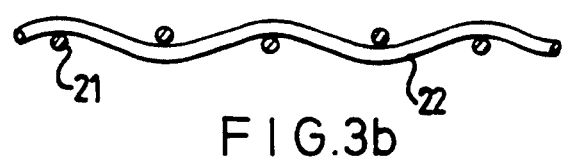

In FIG. 3, a conventional tabby is represented in section in (a) and a tabby according to the invention in (b). In (a) lateral weft strands of cotton 20 are woven between warps of tire cord 21. Lack of stiffness in the weft strands 20 has led to a crimped, undulating configuration thus pulling the warps 21 together (from the selvedges to the center and narrowing the tabby. In (b), however, the cotton weft strands 20 are replaced by much stiffer weft strands 22 of composite yarn as shown in FIG. 1. The result is a wider spacing of warps 21 since the stiffness of the weft strands 22 controls the spacing of the warp ends by an internal 'temple' action.

Figure 4A:
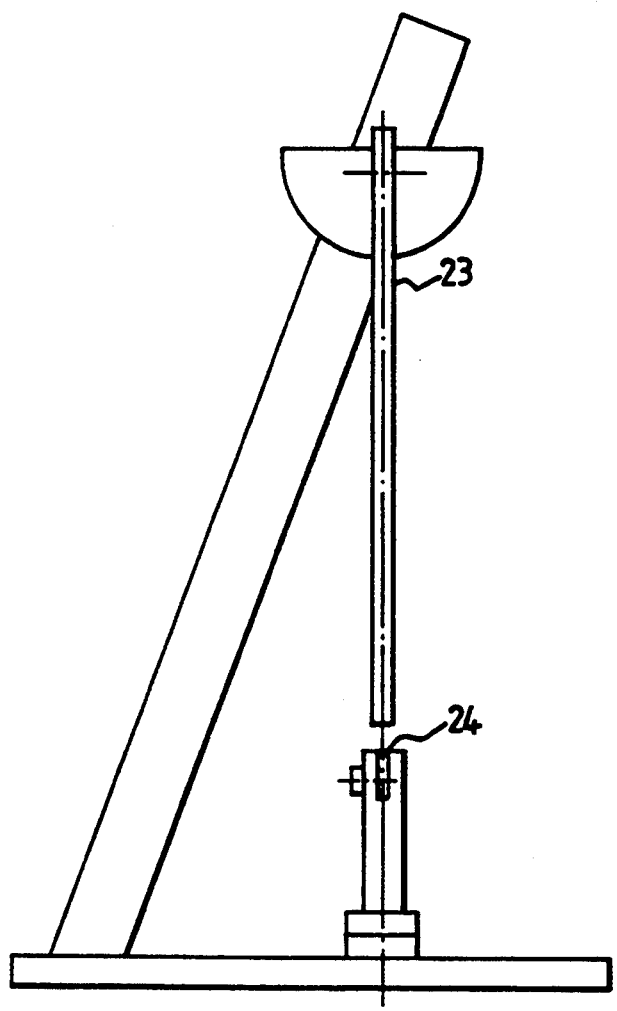
FIG. 4 represents front and side views of the stiffness/bendability apparatus developed by Kordarn a.s. (Czechoslovakia).
Figure 4B:
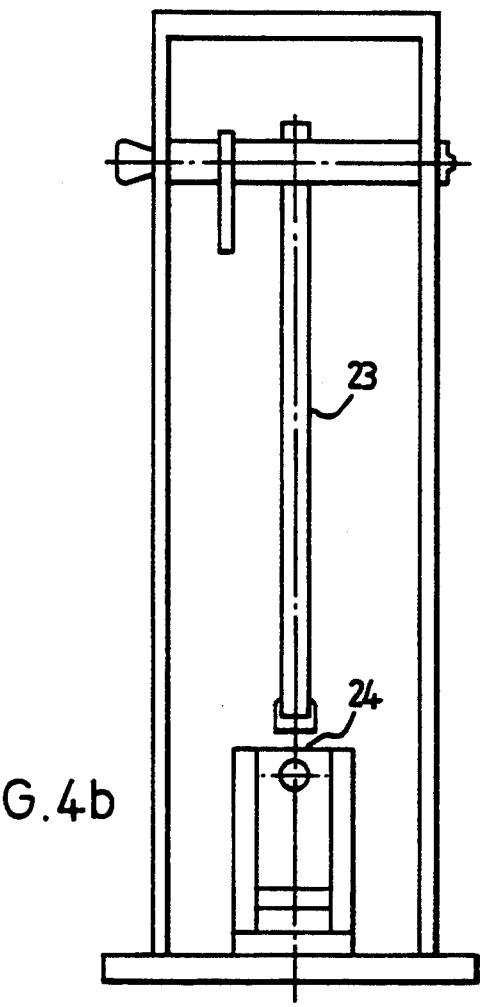

In use, the reinforcing strands 13 ensure that the the tabby remains substantially the full width of the tire cord sheet throughout the dipping, drying and heat setting process. However, it is possible although very seldom encountered that the handling techniques can cause the straight reinforcing weft strands 13 to become displaced in the plane of the sheet for example into wavy, buckled lines rather than straight configurations, thus leading to a slight narrowing of the piece. When this occurs, it is a simple matter to grasp the opposite edges of the tabby and to pull sharply to realign the reinforcing weft strands 13 and restore the full width of the tabby. However this can in part be caused by narrowing of the sheet thus enabling the tabby to stay the same width as the sheet. If desired, this can also be overcome by lateral pulling to straighten the strands 13. The stiffness of the yarn used in the present invention is typically 30 to 100 seconds, preferably 38 to 91 seconds, i.e. about 65 seconds as measured by the stiffness/bendability test developed by Kordarna a.s. (Czechoslovakia). The apparatus for this test is shown in FIGS. 4a and 4b. The pendulum 23 of the apparatus of the apparatus is raised trough an angle of 150 degrees to the vertical and then released. The yarn to be tested is held by a clamp 24, 10 mm of the yarn being allowed to protrude vertically from the clamp. As the pendulum reaches the vertical position it strikes the yarn thus retarding the motion of the pendulum to a certain degree. The time is measured between the release of the pendulum and when the pendulum finally comes to rest. Clearly, the stiffer the yarn, the greater the retardation of the motion of the pendulum and hence the shorter the time before the pendulum comes to rest.

I claim:

1. A method of stabilising the lateral (weft) dimension of the tabby or splicing header of a tyre cord sheet against shrinkage during processing including the application of longitudinal tension and dipping in an aqueous latex bath, hot-air drying and heat setting, by using weft strands in the tabby which are structually different from those in the tyre cord sheet and which are selected to resist shrinkage, characterised in that the weft strands are formed of a resilient, stiff yarn, a stiffness of the yarn being such that lateral shrinkage of the tabby during said processing is about the same as that of the tyre cord sheet itself.

2. A method according to claim 1 in which the stiff yarn is a composite yarn comprising a resilient, stiff fibre or filament component.

3. A method according to claim 2 in which the composite yarn comprises a resilient, stiff core which has been mantled with natural or synthetic fibre.

4. A method according to claim 3 in which the composite yarn comprises a core mantled with fibres by a friction spinning technique.

5. A method according to claim 3 in which the core comprises glass filaments.

6. A method according to claim 3 in which the mantle fibers comprise about 10 to about 70% of the composite by weight.

7. A method according to claim 2 in which the yarn comprises a co-spun or co-twist yarn in which a stiff fibre or filament is combined with non-stiff fibres or filaments.

8. A method according to claim 1 in which the yarn consists essentially of surface-roughened monofil.

9. A tire cord sheet comprising a tabby reinforced by a method according to claim 1.

10. A method according to claim 4 in which the core comprises glass filaments.

* * * * *